United States Patent [19]
Froggatt

[11] Patent Number: 5,296,283
[45] Date of Patent: Mar. 22, 1994

[54] PROTECTIVE COATING FOR MACHINE-READABLE MARKINGS

[75] Inventor: James R. Froggatt, Newark, Del.

[73] Assignee: E. I. Du Pont de Nemours and Company, Wilmington, Del.

[21] Appl. No.: 979,007

[22] Filed: Nov. 13, 1992

Related U.S. Application Data

[63] Continuation-in-part of Ser. No. 819,692, Jan. 13, 1992, abandoned.

[51] Int. Cl.$^5$ .................. B32B 3/00; B32B 5/16; B32B 7/14
[52] U.S. Cl. .................. 428/204; 428/35.7; 428/203; 428/357; 428/421; 428/422; 428/463
[58] Field of Search .................. 428/421, 422, 35.1, 428/34.9, 407, 357, 402, 403, 422, 368, 35.7, 463, 203, 204; 526/247, 249, 254, 255; 430/296; 427/386, 195

[56] References Cited

U.S. PATENT DOCUMENTS

| | | | |
|---|---|---|---|
| 3,762,940 | 10/1973 | Bechtold | 428/421 |
| 4,600,630 | 7/1986 | Quinn et al. | 428/203 |
| 4,670,295 | 6/1987 | Quinn et al. | 427/54.1 |
| 4,754,009 | 6/1988 | Squire | 526/247 |
| 5,118,579 | 6/1992 | Aharoni et al. | 428/421 |
| 5,139,879 | 8/1992 | Aharoni et al. | 428/421 |

FOREIGN PATENT DOCUMENTS

| | | |
|---|---|---|
| 0073087 | 3/1983 | European Pat. Off. . |
| 0393682 | 10/1990 | European Pat. Off. . |
| 3833789 | 4/1990 | Fed. Rep. of Germany . |
| 90-196925 | 6/1990 | Japan . |
| 88/01205 | 2/1988 | PCT Int'l Appl. . |

*Primary Examiner*—Patrick J. Ryan
*Assistant Examiner*—William A. Krynski
*Attorney, Agent, or Firm*—Paul R. Steyermark

[57] ABSTRACT

A method of protecting machine-readable markings on the surfaces of articles consisting in applying to the machine-readable markings a thin layer of an amorphous fluoropolymer, which may be, i.a., a copolymer of perfluoro(1,3-dioxole) or of perfluoro(2,2-dimethyl-1,3-dioxole) with a fluoromonomer selected from a specifically recited group, especially, with tetrafluoroethylene; or a cyclic aliphatic homopolymer in which the repeating unit contains an aliphatic ring of 5-9 members at least two of the ring members being carbon atoms independently substituted either by fluorine atoms or by perfluoromethyl groups, at most two of the ring atoms being oxygen atoms, the remaining portions of the repeating units when present, being pefluoromethylene groups.

4 Claims, No Drawings

PROTECTIVE COATING FOR MACHINE-READABLE MARKINGS

CROSS-REFERENCE TO RELATED APPLICATION

This is a continuation-in-part of my patent application Ser. No. 07/819,692 filed Jan. 13, 1992 now abandoned.

BACKGROUND OF THE INVENTION

This invention relates to a method of protecting machine-readable markings by means of an optically clear, chemically resistant, and mechanically strong coating as well as to articles carrying on their outer surfaces machine-readable markings protected by such coating.

Machine-readable markings are nowadays routinely placed on various objects to provide instant identification of such objects, for example, their nature, price, size, or destination. The most commonly used machine-readable marking is a bar code system, The bar code marking applied to the object is read by a suitable device, which generates a control signal, usually electrical, which is sent to a computer or a computer-controlled apparatus for taking appropriate action. This may be simply entering the information about the object into a database for the purpose of inventory, or directing a manufacturing or processing machine to perform a step in a process, or directing a car or container to the proper destination. Sometimes, machine-readable markings are placed on metal, usually aluminum, tags attached to an object, for example, to a piece of plant or laboratory equipment. Information stored on those tags may, in addition to simple inventory identification, include information about safety or hazards of operation, or maintenance requirements. In other cases, machine-readable markings are often painted on or otherwise applied to the exterior surfaces of shipping containers and railroad freight cars, so that they can be easily identified as to ownership, contents, and destination.

In many applications where machine-readable markings are applied to various objects, the objects themselves are exposed to corrosive environment, for example, in plants or laboratories. In other cases, the objects may be exposed to adverse atmospheric conditions, for example, smog, rain and snow. With time, those markings can become unreadable or inacurate.

It, therefore, is desirable to protect machine-readable markings by means of a coating that can be readily applied, that is transparent to the wavelength used by the contemplated reading device, that is resistant to the corrosive or adverse atmospheric conditions to which the markings may be exposed, and that can be readily cleaned and restored to its original appearance Various protective coatings have been proposed in the past. Thus, U.S. Pat. No. 4,600,630 to Quinn et al. proposes a coating of a polymeric composition that is curable upon exposure to ultraviolet radiation, and then irradiating the overcoating with ultraviolet radiation to produce a cured, nontacky, light-transmitting film.

U.S. Pat. No. 4,670,295 is a division of the application which resulted in U.S. Pat. No. 4,600,630 and discloses a similar coating.

U.S. Pat. No. 4,066,873 to Schatz is concerned with identification and access cards, especially for banking operations. The purpose of protective coating is to prevent wear and damage of the card in normal use. Transparent acrylic or polyvinyl chloride resins are mentioned as suitable for that purpose.

Finally, a sales bulletin of CHR Industries (407 East Street, New Haven, Conn.) discloses a tape made of an ethylene/tetrafluoroethylene copolymer sold by the Du Pont Company under the trademark $T^2$ TEFZEL®. The tape is described as being optically clear and fully "solar and U/V transparent". It is provided with an optically clear acrylic adhesive. Since the copolymer is not readily soluble in organic solvents and, therefore, cannot be applied by spray-coating or dip-coating from a solution, the idea of providing an adhesive-backed tape is a very good one. Still, in many applications, spray-coating or dip-coating, if possible, would be less labor-intensive and, therefore, more economical, and it would be particularly suitable for articles such as identification tags, which could be coated by simple dipping in a polymer solution, as well as for coating large bar codes such as those painted on the outside surfaces of shipping containers and railroad cars, which could be spray-coated. In addition, a clear polymer coating that is not only transparent but also stable to both sunlight and UV radiation and that does not require an adhesive backing, which backing itself may be unstable on prolonged exposure to either sunlight or UV radiation, has the additional advantage of being particularly well suited for outdoor applications.

SUMMARY OF THE INVENTION

According to the present invention, there is now provided an article carrying a machine-readable marking on at least one surface thereof, said marking being protected by a coating of at least one amorphous fluoropolymer selected from:

A) copolymers of perfluoro(1,3-dioxole) with tetrafluoroethylene;

B) copolymers of perfluoro(2,2-dimethyl-1,3-dioxole) with at least one comonomer selected from the class consisting of
  (a) tetrafluoroethylene,
  (b) chlorotrifluoroethylene.
  (c) vinylidene fluoride,
  (d) hexafluoropropylene,
  (e) trifluoroethylene,
  (f) perfluoro(alkyl vinyl ethers) of the formula $CF_2=CFOR_F$, where $R_F$ is a normal perfluoroalkyl radical having 1–3 carbon atoms,
  (g) fluorovinyl ethers of the formula $CF_2=CFOQZ$, where Q is a perfluorinated alkylene radical containing 0–5 ether oxygen atoms, wherein the sum of the C and O atoms in Q is from 2 to 10; and Z is a group selected from the class consisting of $-COOR$, $-SO_2F$, $-CN$, $-COF$, and $-OCH_3$, where R is a $C_1$–$C_4$ alkyl,
  (h) vinyl fluoride, and
  (i) (perfluoroalkyl)ethylene, $R_fCH=CH_2$; where $R_f$ is a $C_1$–$C_8$ normal perfluoroalkyl radical; and C) cyclic aliphatic homopolymers in which the repeating unit contains an aliphatic ring of 5–9 members, at least two of the ring members being carbon atoms independently substituted either by fluorine atoms or by perfluoromethyl groups, and at most two of the ring members being oxygen atoms, the remaining portions of the repeating units, when present, being perfluoromethylene groups.

There also is provided a method of producing the above coatings on machine-readable markings.

DETAILED DESCRIPTION OF THE INVENTION

All the fluoropolymers that are useful in the practice of the present invention are well known, and some of them are commercially available. For example, many amorphous copolymers of perfluoro(2,2-dimethyl-1,3-dioxole) as well as various processes for making them are described in U.S. Pat. Nos. 4,530,569 and 4,754,009, both to Squire. The homopolymer of perfluoro(2,2-dimethyl-1,3-dioxole) is disclosed in U.S. Pat. No. 3,978,630 to Resnick. A homopolymer of perfluoro(1,3-dioxole) and copolymers with tetrafluoroethylene are described in U.S. Pat. No. 4,485,250 to Squire. A number of other fluorohomopolymers within the scope of this invention are described in published European Application 0 392 682 of Asahi Glass Company Limited (published Oct. 24, 1990).

Typical repeating unit structures that may be encountered in the homopolymers of paragraph C of the Statement of the Invention include, for example, the following structures I-V:

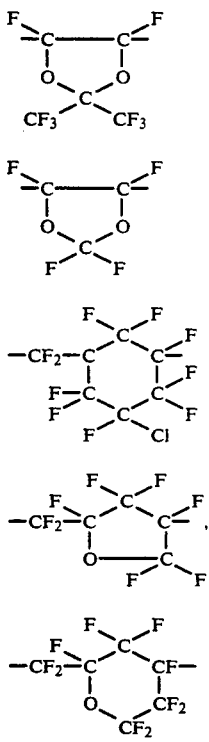

where structure I is derived from perfluoro(1,3-dioxole) and structure II from perfluoro(2,2-dimethyl-1,3-dioxole). Structure III is obtained by free radical polymerization of chloroperfluoroheptadiene represented by formula VI:

$$CF_2=CFCF_2CFClCF_2CF=CF_2 \qquad VI$$

structure IV is obtained by free radical polymerization of perfluoro(vinyl 2-propenyl ether) represented by formula VII:

$$CF_2=CF-O-CF_2-CF=CF_2 \qquad VII$$

and structure V is obtained by free radical polymerization of perfluoro(vinyl 3-butenyl ether) shown by formula VIII:

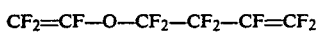

$$CF_2=CF-O-CF_2-CF_2-CF=CF_2 \qquad VIII$$

These last three cyclizing polymerizations are reported in the above-cited European patent application of Asahi Glass Co., further citing U.S. Pat. No. 3,202,643. Generally speaking, in these cyclizing polymerizations the monomer has two double bonds having different reactivities.

Anther typical repeating unit illustrated in the above European application is shown in formula IX,

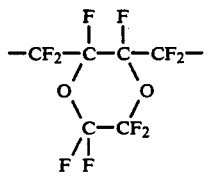

This polymer is made from the following diether:

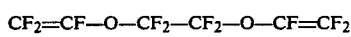

$$CF_2=CF-O-CF_2-CF_2-O-CF=CF_2 \qquad X$$

The preferred fluoropolymers are perfluoropolymers, especially those derived from perfluoro(2,2-dimethyl-1,3-dioxole) (or PDD), and particularly its homopolymer and its amorphous dipolymers with tetrafluoroethylene (or TFE). Amorphous dipolymers with TFE contain at least about 11 mole % PDD, but as the amount of PDD in the dipolymer increases, so does the glass transition temperature (Tg) of the dipolymer, although not necessarily in linear fashion. Dipolymers containing about 65-99 mole % of PDD have Tgs of 140° C. or higher. The PDD homopolymer also is an excellent coating material, which has many useful properties, including a very high Tg, in excess of 300° C., except that it is at present very expensive. Both the homopolymer and the dipolymer are extremely resistant to corrosive environment, including hydrofluoric acid and hydrogen fluoride, are perfectly clear and transparent to a broad range of light frequencies, including the visible and the ultraviolet light. Furthermore, these polymers are soluble in a commercially available solvent, perfluoro(t-butyltetrahydrofuran), sold by 3M Company under the trademark FC-75 ®. Because of that, they can be applied from solution, for example, by spray-coating, dip-coating, brushing, or rolling onto the surface to be protected. After air-drying, the coated article can be heat-treated, for instance, at 160° C. for approximately 15 minutes. A good concentration of polymer to use for such applications is about 3% by weight.

Naturally, preformed polymer film can also be used in many applications, where it can be laminated or bonded to a substrate, especially to bar code tags, which are attached to various pieces of equipment in a plant. In fact, the application of protective coating to the substrate could be automated, so that a bar code printer would have a mechanism attached to it that would apply the coating, either by laminating a polymer film or by applying polymer from solution, then drying and heat-treating the coating. Still, application of the coating from solution will be preferred in many instances because this can be done on substrates of irregular shapes, in the field, covering all the sides of a tag or substrate, rather than only certain surfaces; such methods of application are quick and efficient, can be accomplished by simply painting a coating on the substrate, either with a brush or applicator or with a spraying device. Solution coating has the further advantage of being capable of providing a very thin coating, of only a few millimicrons, which is sufficient for the purpose of protecting machine-readable markings, while lamination of a film or application of a tape would normally require a thicker film or tape which would be resistant to handling without tearing or curling.

The polymer coating, whether applied from solution or laminated or bonded, is easy to clean by either mechanical scrubbing or by washing with ordinary industrial solvents, in which it is insoluble. In fact, a coating of a polymer on machine-readable markings according to the present invention offers exceptional ease of maintenance and is resistant to corrosive gases and vapors as well as to mechanical damage, for example, by repeated contact with a wand of an optical reading device. It is customary in the chemical industry to place tags, near valves and fittings in piping and chemical equipment when monitoring and recording leakage or undesirable emissions of pollutants. Unprotected tags, whether marked with a bar code or carrying other identifying markings, would quickly become dirty or corroded in such hostile environment, but tags protected by means of a coating of a fluoropolymer according to the present invention remain readable or can be quickly cleaned to a condition in which they are optically readable without difficulty. Because of exceptional optical clarity of thin films of polymers contemplated by the present invention over a broad range of wavelength, including infrared and ultraviolet, reading equipment of all kinds can be successfully employed with such protective coating.

This invention is now illustrated by an example of a representative embodiment thereof.

An aluminum tag having the dimension of about $3.8 \times 3.8 \times 0.08$ cm and imprinted on one of its large surfaces with a bar code representing T00171, about $1.1 \times 24$ cm in size, was dipped in a 3% by weight solution of a an amorphous copolymer of perfluoro-2,2-dimethyl-1,3-dioxole with tetrafluoroethylene sold by E. I. du Pont de Nemours and Company under the trademark TEFLON ® AF in perfluoro(2-butyltetrahydrofuran) and dried to constant weight. The thickness of the copolymer coating, calculated from weight increase, was about 1.65 $\mu$m.

A similar tag, representing the code T00115, was left untreated as control.

A third tag, representing the code 021633 was covered with a 0.03 mm thick tensilized and toughened $T^2$ TEFZEL ® (Du Pont ethylene/tertrafluoroethylene copolymer) tape supplied by CHR Industries, New Haven, Conn.

All three tags were scanned in five series of ten replicates by an optical recognition device, Intermec (Houston, Tex.) TRAKKER ® 9462 consisting of a reading wand (Model 1262H) operating at a wavelength of 633 nm, coupled to a processor and display unit. The following table gives the results for each series as a number of correct readings for each group of ten.

TABLE

| TAG | RUN 1 | RUN 2 | RUN 3 | RUN 4 | RUN 5 |
|---|---|---|---|---|---|
| T00171 | 10 | 10 | 10 | 10 | 10 |
| T00115 | 10 | 6 | 9 | 10 | 8 |
| 021633 | 10 | 8 | 9 | 6 | 10 |

Thus the tag coated according to the present invention scored 50 perfect readings out of 50; the untreated tag 43 out of 50; and the tape-covered tag 43 out of 50.

In addition, the unprotected tag T00115 showed damage to aluminum at the end of the test; the tape-protected tag showed tape scratches caused by the wand; while the TEFLON ® AF-coated tag T00171 showed negligible coating wear or damage.

Dried nail polish could be removed with equal ease from the TEFZEL ® and the TEFLON ® surfaces with the adhesive side of a POST-IT ® note (3M Company).

I claim:

1. An article containing a machine-readable marking on at least one surface thereof, said marking being protected by a coating of at least one amorphous fluoropolymer selected from:

A) dipolymers of perfluoro (1,3-dioxole) with tetrafluoroethylene;

B) copolymers of perfluoro(2,2-dimethyl-1,3-dioxole) with at least one comonomer selected from the class consisting of
   (a) tetrafluoroethylene,
   (b) chlorotrifluoroethylene.
   (c) vinylidene fluoride,
   (d) hexafluoropropylene,
   (e) trifluoroethylene,
   (f) perfluoro(alkyl vinyl ethers) of the formula $CF_2=CFOR_F$, where $R_F$ is a normal perfluoroalkyl radical having 1-3 carbon atoms,
   (g) fluorovinyl ethers of the formula $CF2=CFOQZ$, where Q is a perfluorinated alkylene radical containing 0-5 ether oxygen atoms, wherein the sum of the C and O atoms in Q is from 2 to 10; and Z is a group selected from the class consisting of —COOR, —SO$_2$F, —CN, —COF, and —OCH$_3$, where R is a $C_1$-$C_4$ alkyl,
   (h) vinyl fluoride, and
   (i) (perfluoroalkyl)ethylene, $R_fCH=CH_2$; where $R_f$ is a $C_1$-$C_8$ normal perfluoroalkyl radical; and C) cyclic aliphatic homopolymers in which the repeating unit contains an aliphatic ring of 5-9 members, at least two of the ring members being carbon atoms independently substituted either by fluorine atoms or by perfluoromethyl groups, and at most two of the ring members being oxygen atoms, the remaining portions of the repeating units, when present, being perfluoromethylene groups.

2. An article of claim 1 wherein the fluoropolymer is selected from the group consisting of
   (a) homopolymers of perfluroro(2,2-dimethyl-1,3-dioxole) and copolymers of perfluoro(2,2-dimethyl-1,3-dioxole) with tetrafluoroethylene;
   (b) homopolymers of perfluoro(1,3-dioxole) and copolymers of perfluoro(1,3-dioxole) with tetrafluoroethylene; and
   (c) homopolymers of perfluoro(vinyl 3-butenyl ether), said homopolymers having a repeating unit represented by the following formula

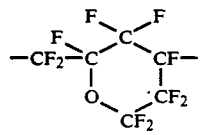

3. An article of claim 1 which is a removable metal tag.

4. An article of claim 3 which is an aluminum tag.

* * * * *